US006828832B2

(12) United States Patent
Gabillard

(10) Patent No.: US 6,828,832 B2
(45) Date of Patent: Dec. 7, 2004

(54) VOLTAGE TO CURRENT CONVERTER CIRCUIT

(75) Inventor: Bertrand Gabillard, Paris (FR)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 10/605,361

(22) Filed: Sep. 25, 2003

(65) Prior Publication Data

US 2004/0113663 A1 Jun. 17, 2004

(51) Int. Cl.[7] ................................................ H02M 11/00
(52) U.S. Cl. ......................................... 327/103; 363/73
(58) Field of Search ............................ 327/103, 52, 53, 327/147, 156, 560–563; 331/57, 177 R; 363/73; 330/253, 257; 375/376

(56) References Cited

U.S. PATENT DOCUMENTS 5,361,040 A * 11/1994 Barrett, Jr. .................. 330/253
5,619,125 A * 4/1997 Lakshmikumar ............ 323/315
5,739,678 A * 4/1998 Nagaraj ...................... 323/268
5,748,050 A * 5/1998 Anderson .................... 331/57
5,815,390 A * 9/1998 Lakshmikumar ............. 363/73
5,978,240 A * 11/1999 Nicollini ...................... 363/73
6,420,912 B1 * 7/2002 Hsu et al. ................... 327/103

OTHER PUBLICATIONS

Article: "Fully Integrated CMOS Phase– Locked Loop with 15 to 240 MHz Locking Range and +50 ps Jitter", IEEE Journal of Solid–State Circuites, vol. 30, No. 11, Nov. 1995.

* cited by examiner

*Primary Examiner*—Minh Nguyen
(74) *Attorney, Agent, or Firm*—James J. Cioffi

(57) ABSTRACT

An improved voltage to current converter circuit having three stages. The first stage amplifies the input voltage signals. The second stage includes first and second/third current sources that are connected in a current mirror configuration with a common node therebetween. The third stage consists of an output transistor to form a half cascode current mirror having its drain connected to the second/third current sources and to the output terminal. The gate of the output transistor is coupled to a bias voltage and to the drain of an additional transistor so that the potential on the gate of the output transistor can vary to have both transistors of the third stage in the saturation state for a wide range of the current flowing through the transistors of the half cascode current mirror.

2 Claims, 5 Drawing Sheets

VOLTAGE TO CURRENT CONVERTER CIRCUIT

BACKGROUND OF INVENTION

Field of the Invention

The present invention relates to analog converters and more particularly to an improved voltage to current converter circuit using a variable bias voltage in the half cascode current mirror in the output stage that is well adapted to phase locked loop (PLL) applications.

To date, the digital IC chips that are packaged on a printed circuit board are generally clocked by a so-called main or system clock which is distributed on the whole board. Even these chips are identical, because they may have different specifications depending they are in the best, nominal or worst case conditions, the clock signals that are derived from the main clock may arrive at different times, so that, for instance, the sampling operations are performed with more or less time shift. This is the role of Phase Locked Loop (PLL) circuits to realign the clock signals in said digital chips for signal synchronization outside the chips. In particular, analog hardware macro PLLs, such as standard PLLs, video/audio PLLs, and the like are widely used inside digital circuits such as microprocessors, DSPs, MPEG 2 decoders, and the like in order to minimize the clock skew at the board level. Unfortunately, PLLs are not perfect circuits and they may induce internal jitter that often becomes the main contributor to clock skew. Therefore, the lower the jitter, the higher the circuit speed and global performance.

Conventional PLLs are generally comprised of a voltage to current (V2I) converter circuit followed by a current controlled oscillator (CCO) circuit. FIG. 1*a* schematically shows the block diagram architecture of such a conventional V2I converter circuit. Now turning to FIG. 1*a*, the V2I converter circuit referenced 10 is basically comprised of three stages referenced 11, 12 and 13. The first stage 11 is formed by two differential amplifiers 14 and 15 having their inputs adequately connected in parallel at input terminals 16 and 17 respectively. Single-ended input voltage signals $V_{FILTP}$ and $V_{FILTN}$ supplied by filters in a preceding stage (not shown) are applied to said input terminals 16 and 17 respectively, to create a differential input voltage Vin therebetween. Likewise, the outputs of differential amplifiers 14 and 15 are connected in parallel at nodes 18 and 19 respectively. The second stage 12 consists of a transconductor formed by three current sources 20, 21 and 22 biased between a positive voltage $A_{VDD}$ and the ground $G_{nd}$ to generate currents 2I, 2I and I respectively. Current source 20 is connected to node 18 and current sources 21 and 22 are connected to node 19. Because V2I converter circuits are generally constructed by analog blocks implementing CMOSFET transistors, these current sources typically feed two NMOS transistors TN1 and TN2 mounted in a current mirror mode (typically in a cascode configuration) with a common gate connection at node 23 (same potential as node 18). Finally, a half cascode current mirror forms the third stage 13, also referred to hereinbelow as the output stage. It consists of transistors TN3 and TN4. Transistor TN3 will be referred to hereinbelow as the output cascode transistor. The drain of NMOS transistor TN3 and the gate of transistor TN4 are tied to node 24 (same potential as node 19) which also plays the role of the output terminal for the whole V2I converter circuit 10. The gate of TN3 receives a constant voltage V, which is around 0.7 V, supplied by a biasing circuit consisting of a current source generating a current $I_b$ and a resistor R (or a transistor). The current $I_c$ which flows into transistors TN3 and TN4 creates an output voltage $V_{IIO}$ at output terminal 24. Output voltage $V_{IIO}$ is applied to the input of the other half cascode current mirror placed in the CCO (not shown) as standard. A similar circuit combination (V2I and CCO) is described in the article "Fully Integrated CMOS Phase Locked Loop with 15 to 240 MHz Locking Range and +/−50 Jitter" authored by Ilya I. Novof & al, and published in the IEEE Journal of Solid State Circuits, vol. 30, N° 11, November 1995, pages 1259–1266.

In reality, the voltage to current converter properly said only consists of stages 11 and 12, in order to inject a current $I_c$, function of the differential input voltage Vin in the half cascode current mirror of the third stage 13. FIG. 1*b* shows the relation between the current $I_c$ and the differential input voltage Vin equal to $V_{FILTP}-V_{FILTN}$. As apparent in FIG. 1*b*, $I_c$=I when $V_{FILTP}-V_{FILTN}$=0.

FIG. 2 shows a typical detailed hardware implementation referenced 10" of the V2I converter circuit 10 of FIG. 1 still in a CMOSFET technology. Like reference (with prime) numerals are used through the several drawings to designate identical (corresponding) parts. Now turning to FIG. 2, the two differential amplifiers 14 and 15 of the first stage 11 have an identical construction and are formed by two pairs of three NMOS transistors, TN5, TN6, TN7 and TN8, TN9, TN10 respectively that are connected as standard. As apparent in FIG. 2, in the second stage 12, each current source is formed by a pair of PMOS transistors TP1/TP2, TP3/TP4 and TP5/TP6 to generate the 2I, 2I and I currents respectively. On the other hand, two NMOS transistors TN11 and TN12 have been added to transistors TN1 and TN2 to complete a cascode current mirror for proper operation thereof. Finally, the third stage 13 remains unchanged with respect to FIG. 1. Reference voltage $V_0$ and $V_1$ are applied to the gate of transistors TN11/TN12 and TN7/TN10 respectively. Supply voltage $A_{VDD}$ and biasing voltages $V_{BP0}$ and $V_{BP1}$ are adequately connected to these transistors as shown in FIG. 2.

The CMOSFET transistors of the V2I converter circuit 10' (and the CCO as well) usually operate in the saturation mode. The jitter that is observed at the CCO circuit output increases if some transistors leave the saturation mode. Unfortunately, in the third stage 13, NMOS transistors TN3 and TN4 cannot be fully saturated at the same time, i.e. the well-known relation Vds>Vgs−Vt which describes the saturation state for a MOS transistor cannot be simultaneously met. This results of their serial connection to realize a cascode current mirror circuit located at the V2I converter circuit 10' output which is fed by the current supplied by the second stage and of the fact that NMOS cascode output transistor TN3 is biased by a constant voltage $V_{BN0}$. Depending upon the current $I_c$ value which varies between approximately 0 and approximately 2I, either transistor TN3 or TN4 goes out of the full saturation, and therefore is no longer noise immune, finally causing a jitter increase which is detrimental to the overall CCO performance.

The saturation voltage margins of transistors TN3 and TN4 are a function of $I_c$ and $V_{BN0}$, but unfortunately, for a given value of the bias voltage $V_{BN0}$, the two functions are not constant, but rather vary in opposite directions. As a matter of fact, the saturation voltage margin of transistor TN3 is a rising function when $I_c$ increases unlike saturation voltage margin of transistor TN4 which is a falling function. Consequently, the optimization of saturation conditions cannot be met on a wide current $I_c$ range.

FIG. 3 shows a plot of Montecarlo simulations describing the saturation voltage margins with the V2I converter circuit

10' performed on 100 cases with a biasing voltage $V_{BN0}$ equal to 0.7 V. This voltage value is easily obtained by injecting a 20 $\mu$A current in a diode-connected FET transistor. A current $I_c$ is simulated and it is assumed to include commutation noise. To that end, this current is 10% modulated at a frequency of 143 MHz (period T=7 ns). As apparent in FIG. 3, the saturation voltage margins (in mV) of respective transistors TN3 and TN4 versus the current $I_c$ (in $\mu$A) are plotted. Curves 25, 26 and 27 represent the worst case, nominal and best case of saturation voltage margins of transistor TN3 respectively. Likewise, curves 28, 29 and 30 represent the worst case, nominal and best case of saturation voltage margins of transistor TN4 respectively. The current $I_c$ varies from about 20 $\mu$A up to 200 $\mu$A. As known for those skilled in the art, either transistor TN3 or TN4 goes into full saturation as soon as its saturation voltage margin is positive. The $I_c$ range where both transistors TN3 and TN4 are in full saturation thus extend from 20 to 210 $\mu$A with a typical process and from 55 (point A) to 165 $\mu$A (point B) for 3-sigma worst case conditions. As a result, the $I_c$ range is reduced by 42% and the frequency tuning range of the CCO is decreased in the same ratio in said worst case conditions.

SUMMARY OF INVENTION

In essence, the present invention consists to use a variable voltage means in a V2I converter circuit built in a CMOSFET technology that is provided with a half cascode current mirror in the output stage to bias the gate of the output cascode transistor instead of using a constant bias to that end. The variable voltage means is designed to ensure that the two transistors of the half cascode current mirror are simultaneously fully saturated for the widest possible range of the current flowing therethrough. In the conventional implementation of a three stage V2I converter circuit including a current mirror in the second stage and a half cascode current mirror in the third stage, said variable voltage means may simply consist of an additional NMOS transistor properly connected to the common node of the current mirror in the second stage. When such an improved V2I converter circuit is used as a component of a PLL, the jitter is better controlled and the yield versus specification is then increased.

It is therefore a primary object of the present invention to provide an improved V2I converter circuit wherein the half cascode current mirror in the output stage is provided with variable voltage means to bias the gate of the output cascode MOS transistor.

It is another object of the present invention to provide an improved V2I converter circuit wherein the half cascode current mirror in the output stage is provided with variable voltage means to bias the gate of the output cascode transistor that are internally implemented.

It is still another object of the present invention to provide an improved V2I converter circuit wherein the two transistors of the half cascode current mirror circuit of the output stage operate in saturation mode over a wide range of the current flowing through said transistors.

It is still another object of the present invention to provide an improved V2I converter circuit which allows to significantly reduce the jitter in PLL circuits for increased performance at the board level.

The novel features believed to be characteristic of this invention are set forth in the appended claims. The invention itself, however, as well as other objects and advantages thereof, may be best understood by reference to the following detailed description of an illustrated preferred embodiment to be read in conjunction with the accompanying drawings.

DETAILED DESCRIPTION

Figure 4:
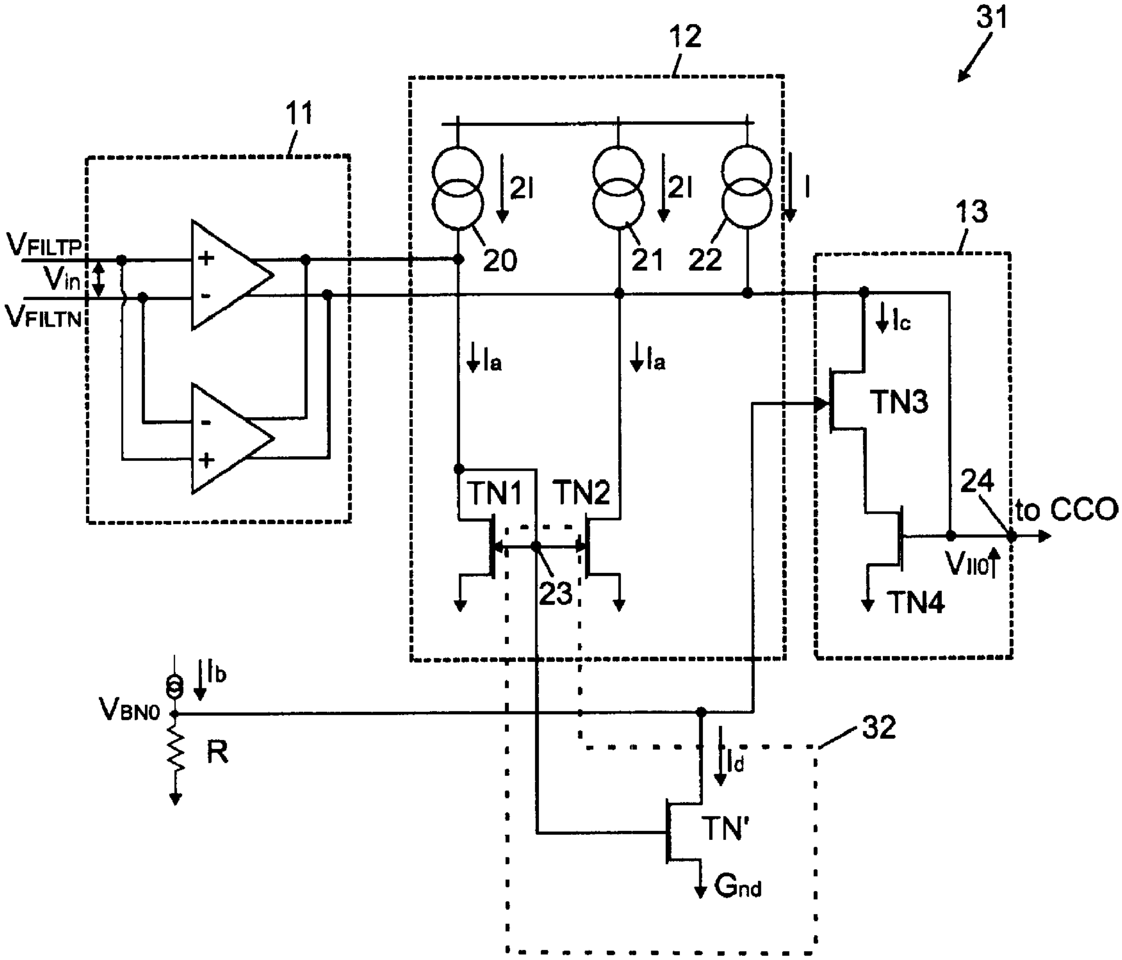
FIG. 4 shows the block diagram architecture of the improved voltage to current (V2I) converter circuit which directly derives from the conventional circuit depicted in FIG. 1 now provided with variable voltage means to bias the gate of the output cascode transistor of the half cascode current mirror forming the output stage according to the present invention.

The block diagram architecture of the improved voltage to current converter (V2I) circuit of the present invention is shown in FIG. 4 where it bears numeral 31. In essence, the improvement consists to implement variable voltage bias means to bias the gate of the output cascode transistor TN3 at a value dependent of the current $I_c$ flowing therethrough. In this particular implementation, the innovative contribution mainly lies in block 32 and simply consist of a single NMOS transistor referenced TN' properly connected. As apparent in FIG. 4, said transistor TN' has its gate connected to the common gate of TN1 and TN2 at node 23, its source is tied to ground and its drain is connected to both $V_{BN0}$ and the gate of TN3. Transistor TN' derives a fraction of the current $I_b$ and thus modifies the voltage $V_{BN0}$ which is applied to the gate of transistor TN3. The current $I_d$ which flows through transistor TN" is equal to $kI_a$, i.e. $k(3I-I_c)$, where k is a factor which depends on the size difference between transistors TN1/TN2 and TN', and thus of current $I_c$ which is determining for the saturation state of transistor TN'.

Figure 5:
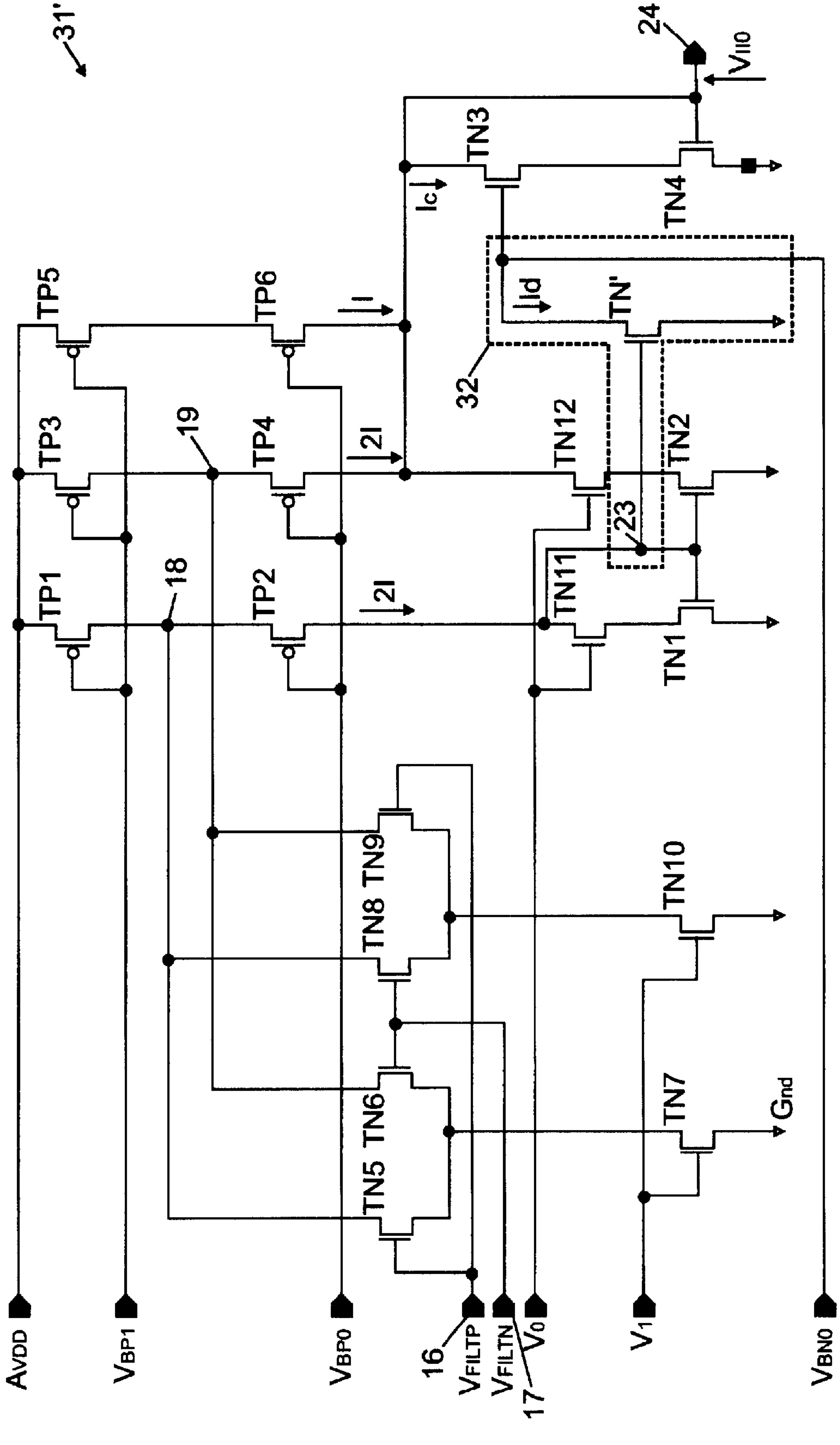
FIG. 5 shows the detailed hardware implementation of the improved V2I converter circuit depicted in FIG. 4 according to the present invention.

FIG. 5 shows the typical detailed hardware implementation of the improved V2I converter circuit of the present invention schematically illustrated in FIG. 4. In FIG. 5, this implementation, referenced 31', is based on the same CMOSFET technology used in the FIG. 4 implementation.

Figure 3:
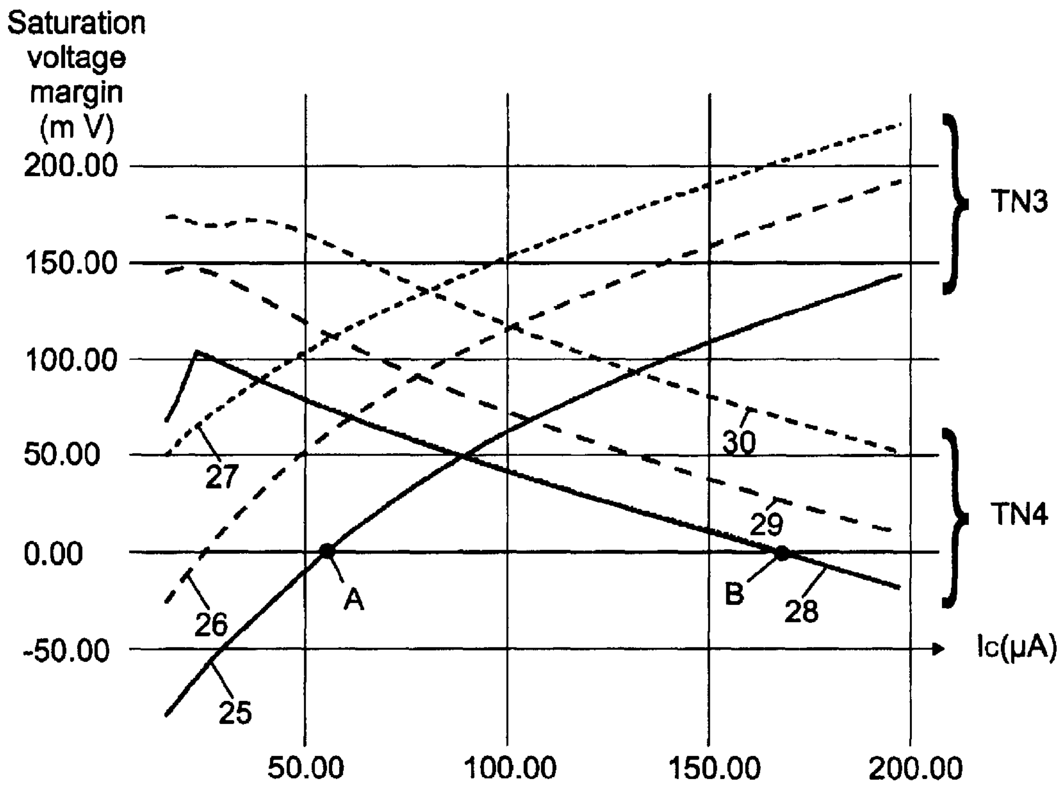
FIG. 3 (Prior Art)
FIG. 3 shows a plot of the saturation voltage margins of output transistors TN3 and TN4 forming the half cascode current mirror in the output stage of the conventional V2I converter circuit of FIG. 2.
Figure 6:
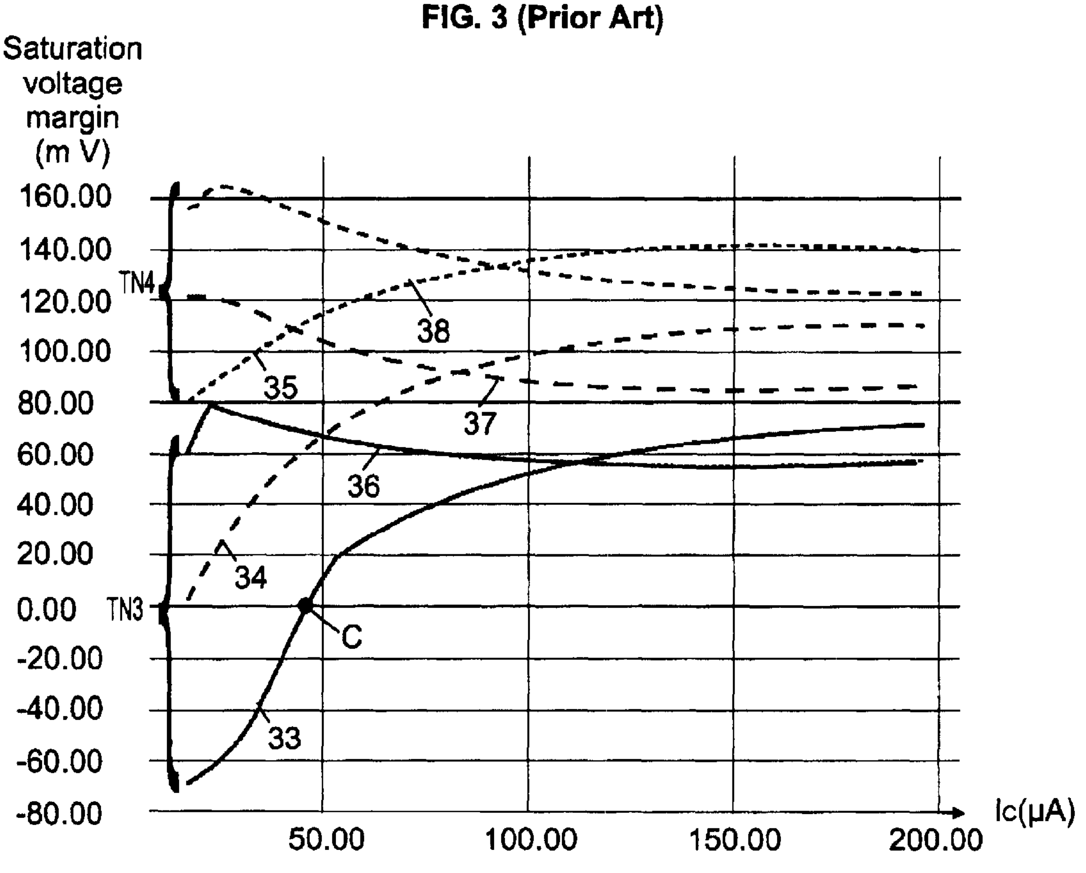
FIG. 6 shows a plot of the saturation voltage margins of output transistors TN3 and TN4 of the improved V2I converter circuit of FIG. 5 for comparison purposes with the corresponding plot of FIG. 3.

The 100 case Montecarlo simulation described above by reference to FIG. 3 was performed again with the improved V2I converter circuit 31' using the same operating conditions and current $I_c$ range for comparison purposes. FIG. 6 shows the saturation voltage margins of respective NMOS transistors TN3 and TN4 versus the current $I_c$. Curves 33, 34 and 35 represent the worst case, nominal and best case of saturation voltage margins of transistor TN3 respectively. Likewise, curves 36, 37 and 38 represent the worst case, nominal and best case of saturation voltage margins of transistor TN4 respectively. As apparent in FIG. 6, the $I_c$ range where both transistors TN3 and TN4 are in saturation has no visible upper limit. Only the lower limit has increased from about 17 μA with a typical process up to 46 μA (point C) for 3-sigma worst case conditions.

Furthermore, another important advantage with the circuit of the present invention is that the saturation voltage margin curves for both transistors TN3 and TN4 are almost flat on a wide $I_c$ range, and in particular for high $I_c$ currents, improving thereby the $I_c$ tuning range and finally the CCO frequency tuning range. As apparent in FIG. 6, the plot clearly shows that the improved V2I converter circuit 31' reduces the sensitivity, i.e. the curve gradient, of the saturation voltage margins of transistors TN3 and TN4 with regards to the $I_c$ current, within the 60 to 200 μA $I_c$ range, by a factor of 3.5 and 7.5, respectively.

Figure 1A:
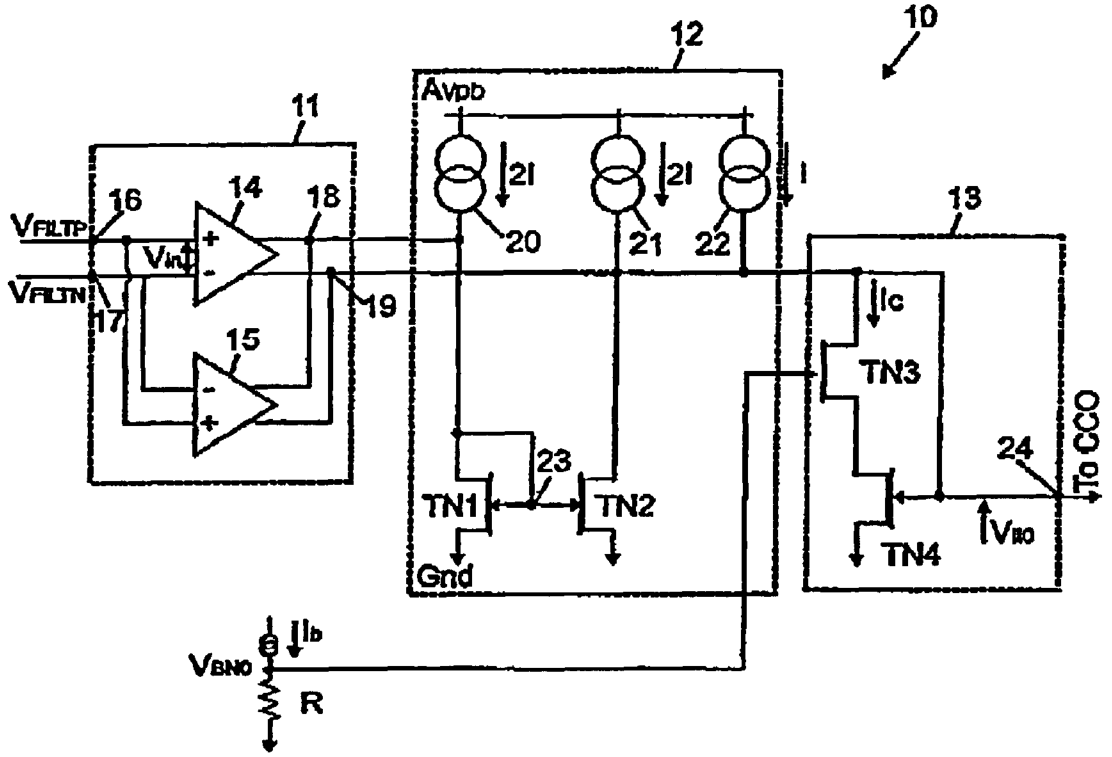
FIG. 1a (Prior Art)
FIG. 1*a* schematically shows the block diagram architecture of a conventional voltage to current (V2I) converter circuit.
Figure 1B:
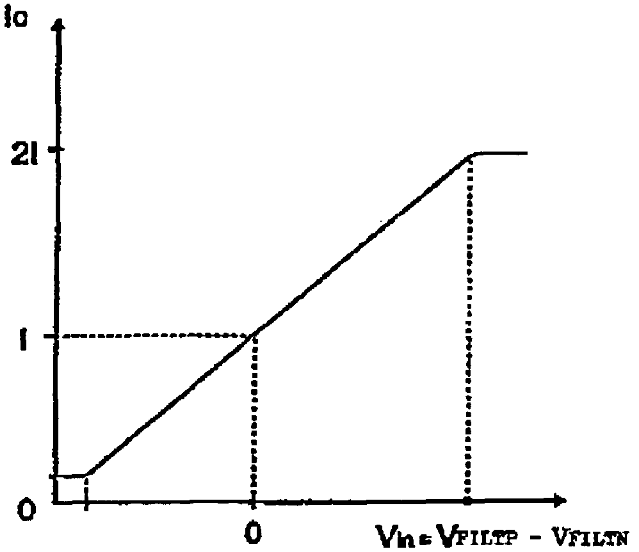
FIG. 1*b* is a curve illustrating the relation between current $I_c$ and the differential input voltage Vin equal to $V_{FILTP}-V_{FILTN}$.
Figure 2:
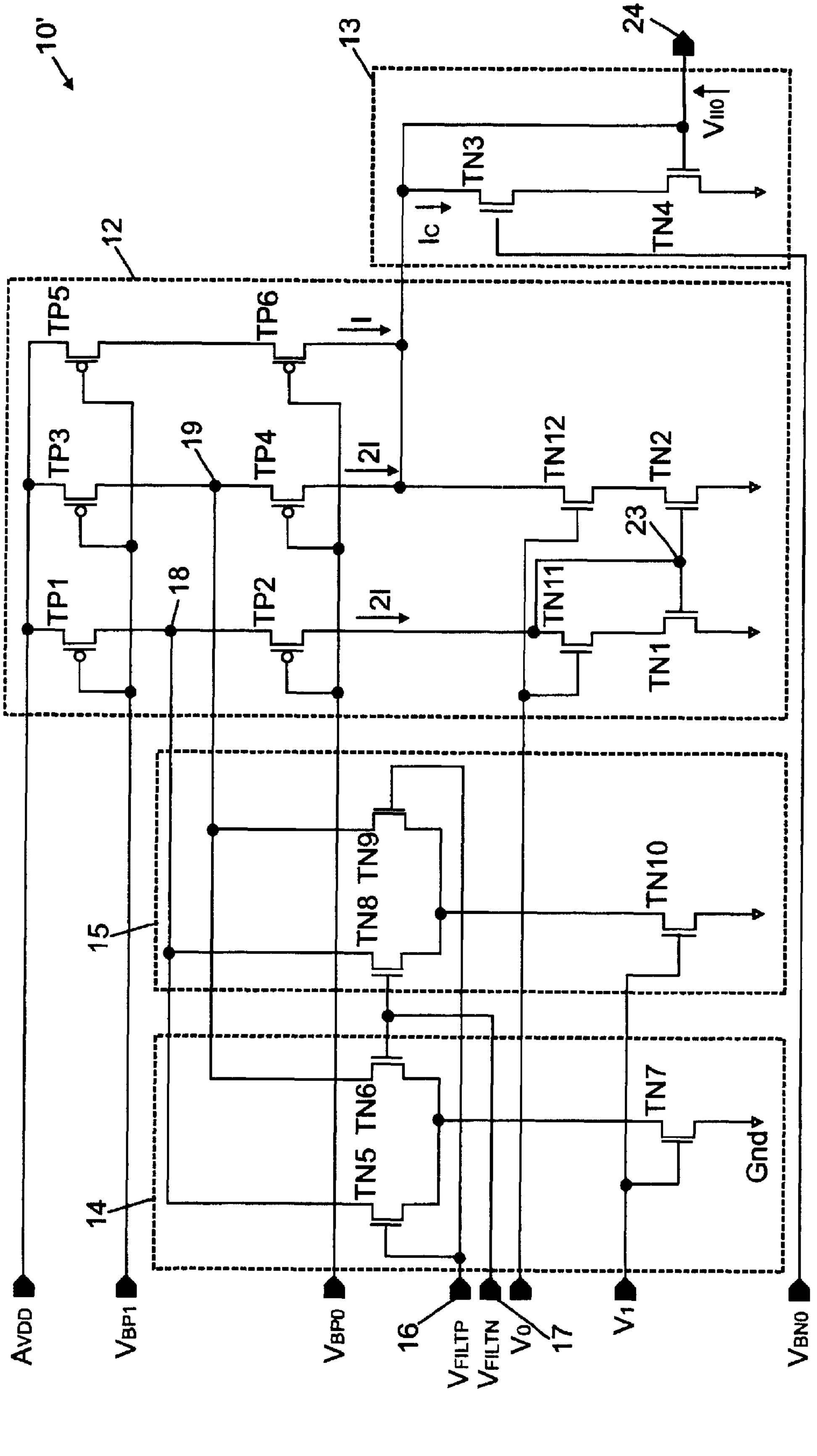
FIG. 2 (Prior Art)
FIG. 2 shows a detailed hardware implementation of the conventional V2I converter circuit of FIG. 1 in a standard CMOSFET technology.

The converter circuit 31' of FIG. 5 is well adapted to many PLL applications, and in particular to all PLL designs based on the V2I converter circuit architecture of FIG. 1 approach, at the very low cost of a single small NMOS transistor TN' in the described implementation.

While the invention has been particularly described with respect to a preferred embodiment thereof it should be understood by one skilled in the art that the foregoing and other changes in form and details may be made therein without departing from the spirit and scope of the invention.

What is claimed is:

1. An improved voltage to current converter circuit in CMOSFET technology comprising:

first and second input terminals to receive input voltage signals;

an amplifying stage having first and second differential inputs connected to said first and second input terminals and first and second differential outputs;

current source means biased between first and second supply voltages comprising a first current source generating a current connected to said first differential output loaded by a first transistor, and second/third current sources respectively generating current and connected to said second differential output loaded by a second transistor, wherein said transistors are connected in a current mirror mode with a common node therebetween;

an output stage consisting of third and fourth transistors forming a half cascode current mirror having the drain of said third transistor connected to said second differential output and to the gate of the fourth transistor at a node forming the voltage to current converter circuit output terminal and having its gate connected to a bias voltage; and variable bias means consisting of a fifth transistor, the drain of which is coupled to the gate of said third transistor and the gate is coupled to said common node.

2. The improved voltage to current converter circuit of claim 1 wherein said bias voltage is obtained from of a current source with a resistor connected in series therewith.

* * * * *